April 28, 1942.  H. J. HORN  2,281,153

VEHICLE WHEEL

Filed Aug. 16, 1941

INVENTOR.
HARRY J. HORN.

BY Carroll R. Taber

Patented Apr. 28, 1942

2,281,153

UNITED STATES PATENT OFFICE 2,281,153

VEHICLE WHEEL

Harry J. Horn, Lansing, Mich., assignor to Motor Wheel Corporation, Lansing, Mich., a corporation of Michigan Application August 16, 1941, Serial No. 407,102

6 Claims. (Cl. 301—37)

This invention relates to vehicle wheels, and more particularly to the combination with a wheel member and a cover member of a novel form of spring clip for detachably connecting the cover member to the wheel member.

The principal object of this invention is to provide a construction in which the cover will go on easy and come off hard—thus preventing accidental dislodgment of the cover. This object is attained primarily by providing the engaging portion of the spring clip with outwardly diverging side edges which bite into the member engaged thereby upon relative movement of the two members away from each other when in assembled position.

The objects and advantages of the present invention will more fully appear from the following description when read in connection with the accompanying drawing, wherein—

Figure 1:
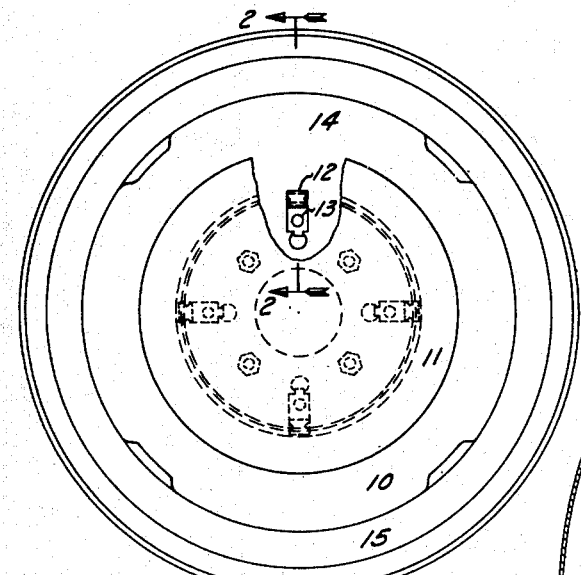
Figure 1 is a front view in elevation of a wheel including a wheel member, a cover member and attaching clips, a portion of the cover member being broken away to show the attaching clip.
Figure 2:
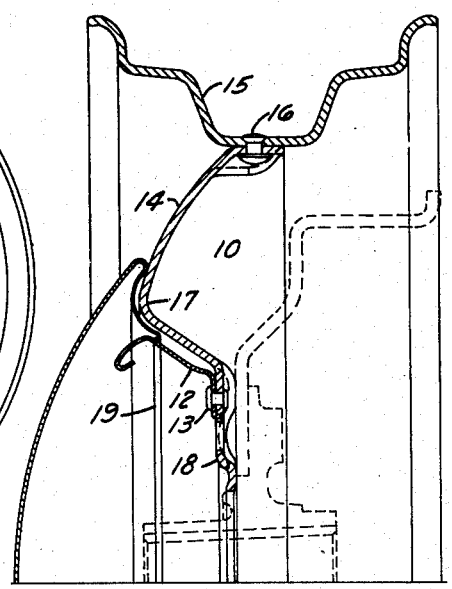
Figure 2 is a sectional view taken on the line 2—2 of Figure 1.
Figure 3:
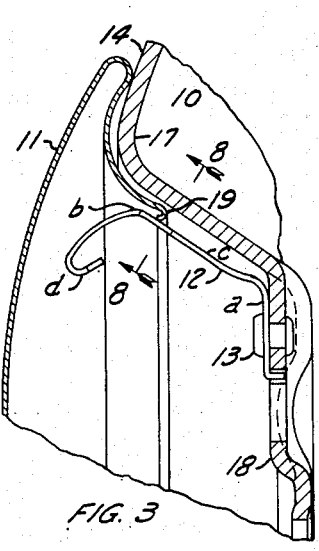
Figure 3 is an enlarged fragmentary sectional view similar to the section shown in Figure 2.

The construction shown in Figures 1, 2 and 3 includes a wheel member 10, a cover member 11, and spring clips 12 permanently attached to the wheel member by rivets 13 and detachably engaging the cover member 11.

The wheel member 10 includes a disk 14 having a rim 15 secured to the periphery thereof by rivets 16. The central portion of the disk 14 is dished to form a convex nose portion 17 and a radially extending bolting-on flange 18. The wheel member 10 is adapted to be mounted on a hub in the usual manner, a conventional hub construction including a brake drum being shown on dotted lines in Figure 2.

The cover 11, as shown in Figures 1 and 2, is in the form of a hub cap having its peripheral portion bent inwardly to form an annular bead 19 located within the dished portion of the wheel disk 14 and adapted to be engaged by the spring clips 12.

Figures 6, 7:
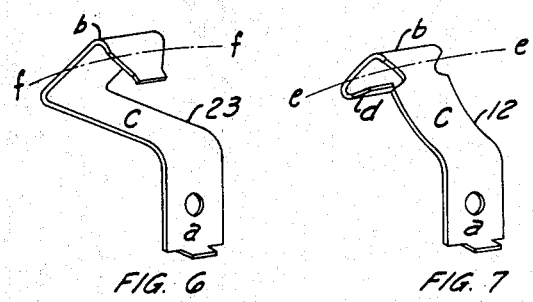
Figure 6 is a perspective view of the spring clip shown in Figure 5.
Figure 7 is a perspective view of the spring clip shown in Figures 1, 2, 3 and 4.

Each of the spring clips 12 comprises a substantially flat elongated strip of resilient material bent to the configuration shown. Any desired number of the spring clips 12 may be utilized, four being shown in Figure 1. The details of the spring clip are shown in Figure 7. It includes a base or attaching portion $a$, an engaging portion $b$ in the form of a substantially V-shaped hump, an intermediate body portion $c$, and a reversely bent free end portion $d$.

The attaching portion $a$ of the clip 12 is permanently connected to the bolting-on flange 18 of the wheel member by the rivets 13, as previously mentioned. The body portion $c$ extends axially and radially outwardly from the base portion, and the engaging portion $b$ is located in close proximity to the adjacent face of the wheel disk 14.

In mounting the cover on the spring clips the bead 19 is pressed axially inwardly against the outer side of the hump $b$ on the spring clip until the apex of the hump is sprung past the bead. When that has occurred, the bead 19 is located on the inner side of the hump $b$ and the cover is held in position by the resilient engagement of the spring clips. In removing the cover, the bead 19 is pressed axially outwardly against the inner side of the hump $b$ until the apex of the hump is sprung past the bead 19.

As previously stated, the principal object of this invention is to provide a construction in which the cover will go on easy and will come off hard. Stated in another way, it is desired that a greater force be required in order to remove the cover than is required in order to install the cover. The construction and arrangement of the parts by which this objective is attained will now be described.

Figure 8:
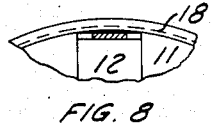
Figure 8 is a sectional view taken on the line 8—8 of Figure 3.

From the foregoing description it will be apparent that the bead 19 engages the side edges of each of the spring clips 12 inasmuch as the spring clips are substantially flat and the bead 19 is annular. In order to provide a biting engagement between the side edges of the clip and the bead 19 upon relative movement of the cover member away from the wheel member, the width of the clip is reduced adjacent the junction of the body portion $c$ and the bottom of the hump $b$, and the side edges are outwardly diverging from that point to near the apex of the hump $b$—as best shown in Figure 7. Consequently, when the cover member is moved to the left from the position shown in Figures 2 and 3 there is a wedging or progressively greater biting engagement between the outwardly diverging side edges of the clip and the bead 19, which necessitates a substantially greater force to remove the cover than is required to install the cover. The relationship between the bead 19 and the outwardly diverging side edges of the clip when the parts are assembled as in Figures 2 and 3 is shown in Figure 8 and by the dotted line $e$—$e$ in Figure 7.

Figure 4:
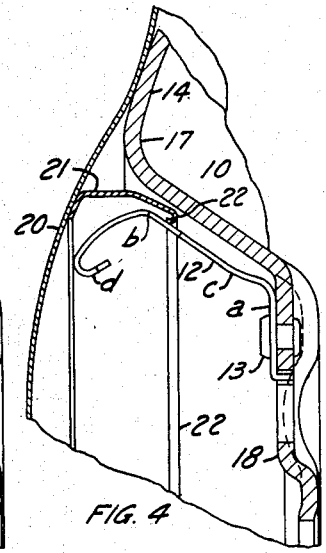
Figure 4 is a fragmentary sectional view showing a modified form of cover construction.

In the construction shown in Figure 4 the wheel member 10 and the spring clips 12 are exactly the same as those previously described. However, the cover member 20 of this construction is somewhat different than the cover member 11 previously described. In this modification the cover 20 extends radially outwardly toward the rim and there is provided an annular ring 21 permanently secured to the cover adjacent the center thereof. The free edge of ring 21 is inturned to provide a bead 22 which cooperates with the spring clip 12 in exactly the same manner as the bead 19 of cover 11. That is to say, the outwardly diverging side edges of the engaging portion of the clips 12 bite into the bead 22 upon a relative movement of the cover 20 away from the wheel member 10.

Figure 5:
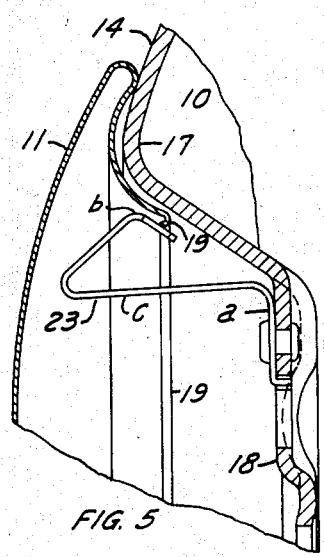
Figure 5 is a fragmentary sectional view showing a modified form of spring clip construction.

In the construction shown in Figure 5 the wheel member 10 and the cover member 11 are identical to the corresponding parts shown in Figures 1 to 3 inclusive, and heretofore described. However, spring clip 23 of this modification differs from the spring clip 12 previously described.

The details of the spring clip 23 are shown in Figure 6. It includes a base or attaching portion $a$, a hump or engaging portion $b$, and an intermediate body portion $c$. As in the case of the clip 12, the clip 23 is formed from an elongated strip of substantially flat resilient material. The body portion $c$ extends at an angle to the attaching portion $a$, and the engaging portion $b$ is formed by bending the clip back upon itself so that the side of the hump $b$ nearest the end of the clip extends in a direction toward the attaching portion $a$.

As in the case of the spring clip 12, clip 23 is provided with a portion of reduced width adjacent the base of one side of the hump and the side edges of the clip are outwardly diverging from the point of reduction to near the apex of the hump. Thus, the outwardly diverging side edges of the clip 23 bite into the bead 19 when the cover member 11 is moved away from the wheel member 10. The relation between the bead 19 and the outwardly diverging side edges of the clip, when the parts are in the assembled position illustrated in Fig. 5, are shown by the dotted line $f-f$ in Figure 6.

It will be noted that in both forms of spring clip the outwardly diverging side edges are provided on the side of the hump remote from the cover. The reason for this arrangement will of course be apparent.

From the foregoing description it will be apparent that while the clips 12 and 23 are of a specifically different configuration, they nevertheless both embody the same feature of providing for a biting engagement with the attaching portion of the cover member when the cover member is removed from the wheel member so as to require a greater force to remove the cover member than is required to install the cover member. Likewise, it will be apparent that either form of clip may be used with either form of cover.

In certain of the claims the expression "outboard end" is used to identify the free end of the clips 12 and 23, and the expression "inboard end" is used to identify the attached end or base portion of the clip.

The scope of the invention is indicated in the appended claims.

I claim:

1. In combination, a wheel member, a cover member, and a spring clip having an inboard end and an outboard end, said clip comprising a strip of resilient metal formed to provide an engaging portion near the outboard end thereof, said strip being of gradually decreasing width from near the outboard end to near the inboard end of said engaging portion, the inboard end of said clip being rigidly connected to one of said members, the outboard end of said clip resiliently engaging the other of said members, said last mentioned member having an annular edge portion contacting the lateral edges of the engaging portion of the clip in the region of the narrowest portion thereof, whereby upon relative movement of the members away from each other the lateral edges of the clip bite into the annular edge of the last mentioned member.

2. In combination, a wheel member, a cover member, and a spring clip having an inboard end and an outboard end, said clip comprising a strip of resilient material formed to provide a substantially V-shaped hump near the outboard end thereof, the strip being of gradually decreasing width from near the apex to near the base of the hump on the inboard side of the hump, the inboard end of said clip being rigidly attached to one of said members, the outboard end of said clip resiliently engaging the other of said members, said last mentioned member including an annular edge portion contacting the lateral edges of the clip between the apex and the base of the hump on the inboard side thereof, whereby upon relative movement of the members away from each other said lateral edges of the hump bite into said annular edge portion of the last mentioned member.

3. The combination defined in claim 2 wherein the outboard side of the hump is disposed adjacent the free end of the strip at the outboard end of the clip.

4. The combination defined in claim 2 wherein the inboard side of the hump is disposed adjacent the free end of the strip.

5. A spring clip having an inboard end and an outboard end comprising a strip of resilient metal formed to provide a substantially V shaped hump near the outboard end of the clip, the strip being of gradually decreasing width from near the apex to near the base of the hump on the inboard side thereof.

6. In combination, a wheel member, a cover member, and a spring clip having one end portion rigidly attached to one of said members and the other end extending freely away from the said attached end, said clip comprising a strip of resilient metal formed to provide a generally V-shaped hump near the free end thereof, said other member including an annular edge portion adapted to be sprung over the apex of the hump and into engagement with the lateral edges of the clip on the remote side of the hump to detachably connect the members together, the portion of the strip forming the said remote side of the hump being of gradually decreasing width from near the apex to near the base of the hump, whereby upon relative movement of the members away from each other the lateral edges of the clip bite into said annular edge portion of the last mentioned member.

HARRY J. HORN.